COVER SHEET STRIPPING MECHANISM

Original Filed March 31, 1947 4 Sheets-Sheet 1

INVENTOR.
Nathan H. Morrison

BY Pennie Edmonds Morton & Barrows
ATTORNEYS

INVENTOR.
Nathan H. Morrison

BY Pennie Edmonds Morton Barrows

ATTORNEYS

July 10, 1951 N. H. MORRISON 2,560,301

COVER SHEET STRIPPING MECHANISM

Original Filed March 31, 1947 4 Sheets-Sheet 3

INVENTOR.
Nathan H. Morrison

BY Pennie Edmonds Morton & Barrows

ATTORNEYS

July 10, 1951 N. H. MORRISON 2,560,301

COVER SHEET STRIPPING MECHANISM

Original Filed March 31, 1947 4 Sheets-Sheet 4

INVENTOR.
Nathan H. Morrison

BY Pennie, Edmonds, Morton & Barrows
ATTORNEYS

Patented July 10, 1951

2,560,301

UNITED STATES PATENT OFFICE 2,560,301

COVER SHEET STRIPPING MECHANISM

Nathan Harrison Morrison, Lowell, Mass., assignor, by mesne assignments, to Film 'n File, Inc., New York, N. Y., a corporation of Delaware Original application March 31, 1947, Serial No. 738,384. Divided and this application July 22, 1949, Serial No. 106,277

9 Claims. (Cl. 154—1)

This invention relates to apparatus for mounting microfilms and the like in openings in cards, and more specifically to means for removing or stripping a temporary protective cover strip from the peripheral margin of the card surrounding the opening into which the microfilm or the like is to be mounted, or from an adhesively-coated paper which is secured in or over the opening in the card and to which the microfilm or the like is to be secured.

In my co-pending application Serial No. 738,384, filed March 31, 1947, now Patent No. 2,493,159, of which this application is a division, I have claimed the combination of means for broadly removing a temporary protective cover sheet from an opening in a card into which a film or the like is to be mounted and for thereafter mounting films, etc. in the openings in the cards, as well as apparatus for cutting and mounting selected portions of films etc. in the openings of cards.

The improved apparatus is particularly intended for use in card record systems and with cards such as described in prior applications Serial Nos. 592,981 and 609,424, the latter now abandoned. In such systems the cards are advantageously prepared with one or more openings therein, in which the microfilm, etc. is to be inserted, and with a thin sheet of transparent adhesive paper secured to the card around the opening and extending into the opening so that the microfilm may be secured to the adhesive when inserted in the opening. As described in said prior applications, the thin adhesive sheet which extends into the opening is advantageously protected by a removable cover sheet, such as a sheet of glassine paper, until the card is ready for the insertion of the microfilm, etc. therein.

Such cards can be prepared by cutting or punching openings therein, of appropriate size for the films to be inserted therein, by applying a thin, transparent sheet of adhesive paper to cover the opening and to extend over the adjacent marginal edges of the card, then cutting out the central portion of the adhesive paper to leave a marginal edge extending into the opening, and applying the protective cover sheet of e. g., glassine paper, to the marginal adhesive paper in the opening.

Such film record cards can be prepared in large number as articles of commerce and supplied to the user. They can be processed through well-known perforating, printing and verifying machines to produce thereon and therein the indicia for identifying and classifying the film or other insert to be mounted therein. Cards so prepared are ready for mounting the microfilms, etc. therein but require removal of the protective cover sheet prior to such mounting.

The improved apparatus of the present invention enables the protective cover sheet to be removed, so that a section of a film may be cut out and centered and applied in the opening.

In a preferred specific embodiment of the present invention, grippers are operable, after the card with the protective cover sheet in place in the opening thereof has been moved to a predetermined position in which it is held, to grip the opposite faces of the cover sheet and to strip it from the adhesively-coated paper in the opening of the card to which it is secured, or to strip it from an adhesively-coated marginal edge of the card surrounding the opening. In such stripping operation, one of the gripping members passes through the opening in the card from the side thereof opposite that from which the cover sheet was applied and forces the cover sheet from its adhesive-retaining means.

The nature and advantages of the invention will be further described in connection with the accompanying drawings which illustrate a relatively small portable hand-operated machine for mounting sections of photographic film in openings of record cards of the type heretofore described and which embodies the novel stripping means of the present invention. However, it is to be understood that such further illustration and disclosure is by way of exemplification and the invention is not limited thereby, except to the extent set forth in the subjoined claims.

Figure 4:
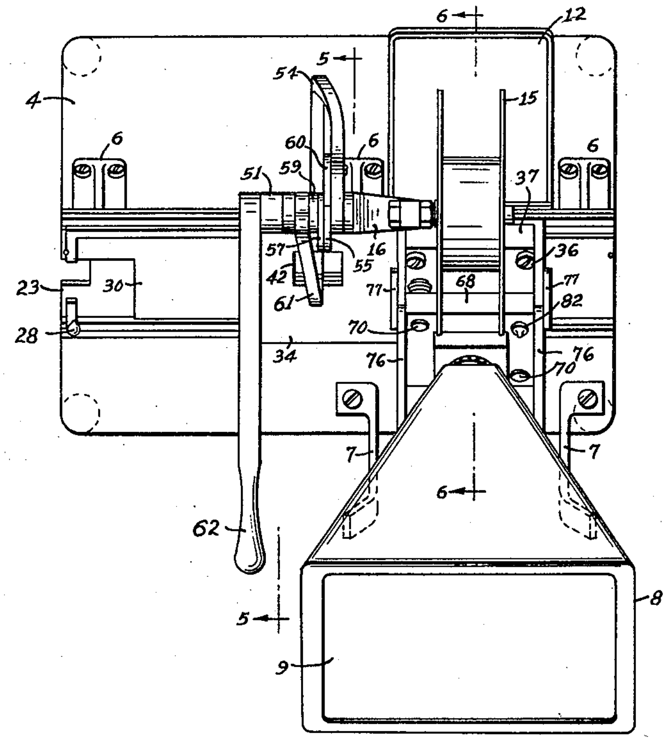
Fig. 4 is a plan view of the apparatus.
Figure 11:
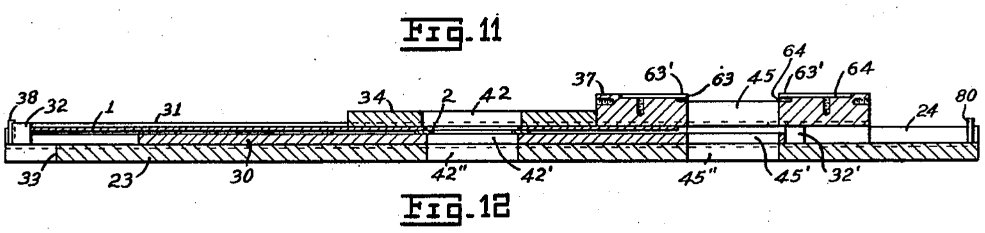
Figure 12:
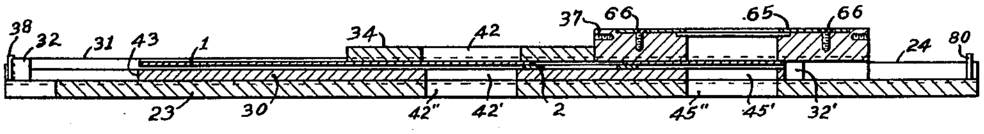
Figure 13:
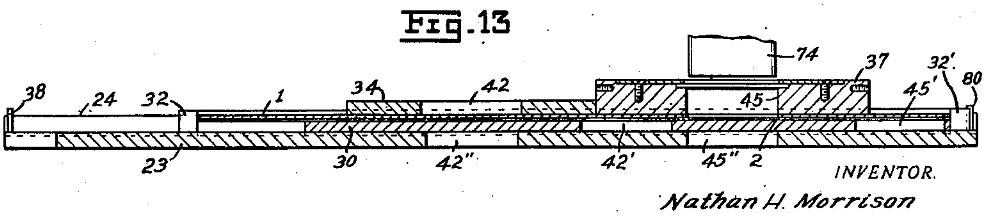
Figure 14:
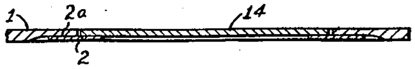
Figures 5, 5A, 6:
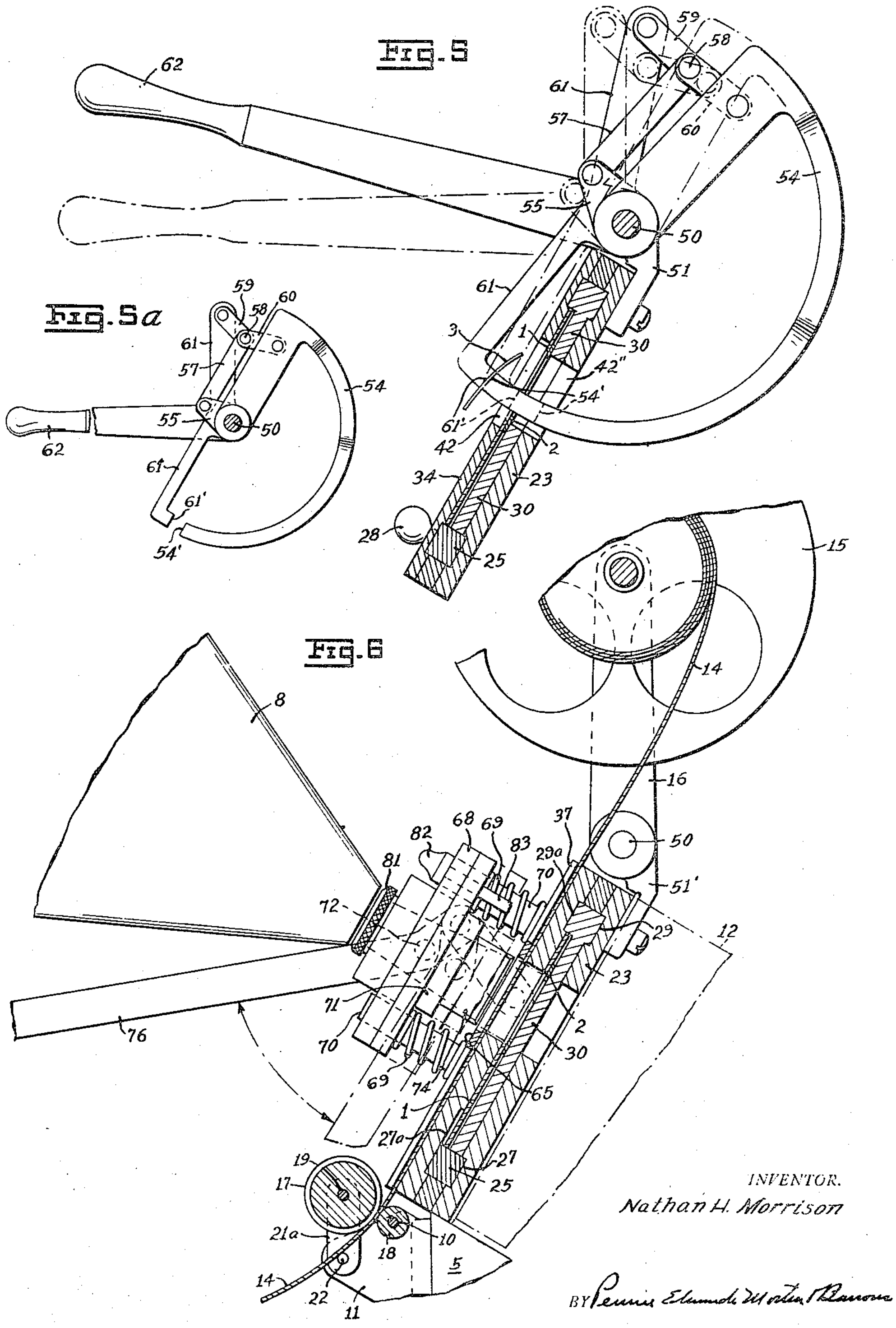
Figures 7, 8, 9:
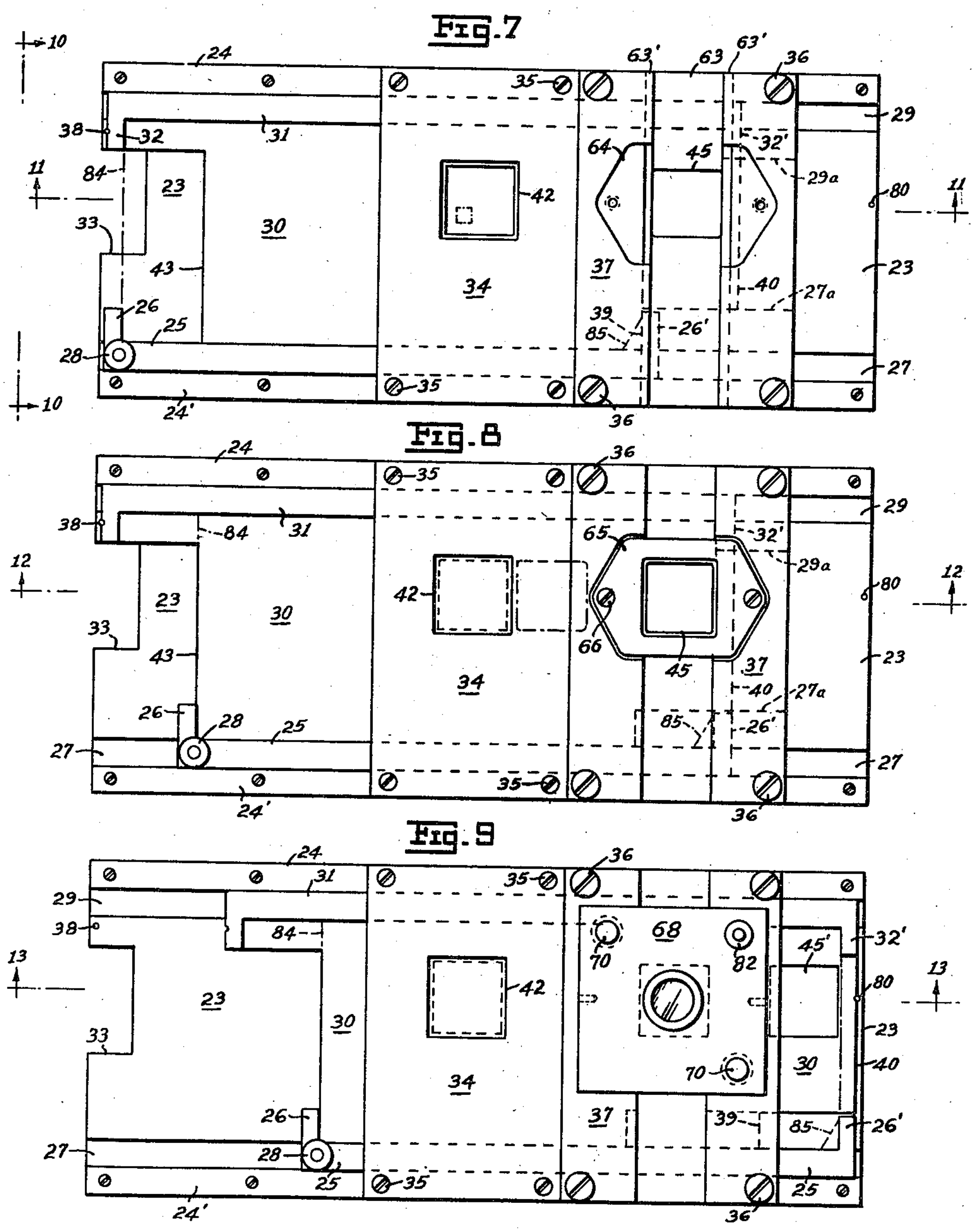
Figure 10:
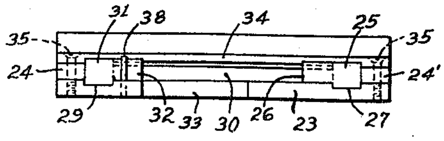

Fig. 5 is an enlarged view, partly in section and partly in elevation, taken generally on the line 5—5 of Fig. 4 and showing the stripping elements and their operation, Fig. 5a is a smaller and somewhat diagrammatic view of the elements of the stripper separated from the remaining portions of the apparatus, Fig. 6 is an enlarged sectional view with parts in elevation taken on the line 6—6 of Fig. 4, Fig. 7 is a top view of the plate assembly with the parts in position for stripping the protective cover sheet from the opening in the card, other parts of the apparatus being omitted, Fig. 8 is a view similar to that of Fig. 7 with the parts in intermediate position and with certain additional parts shown, Fig. 9 is a similar view with the parts in position for mounting the film in the card and with the film cutting and mounting mechanism also shown, Fig. 10 is an end view of the plate assembly from the position indicated by the lines 10—10 of Fig. 7, Fig. 11 is a sectional view of the plate assembly taken along the lines 11—11 of Fig. 7, Fig. 12 is a similar sectional view of the plate assembly taken along the line 12—12 of Fig. 8, Fig. 13 is a similar sectional view of the plate assembly taken along the line 13—13 of Fig. 9, and Fig. 14 is an enlarged sectional view taken through a portion of the completed card with the film therein.

Figures 1, 2, 3:
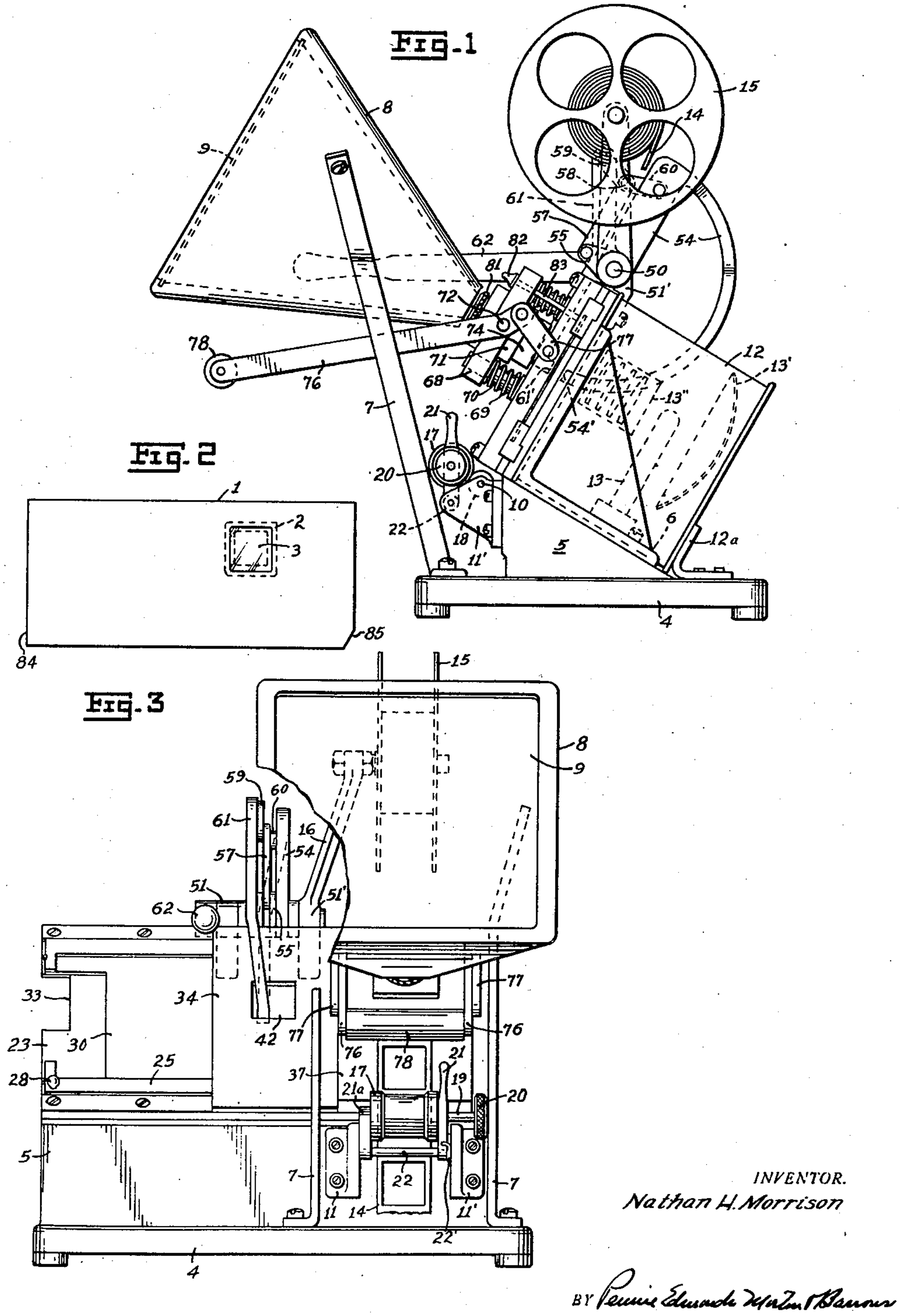
Fig. 1 shows an apparatus embodying the present novel stripping means in side elevation.
Fig. 2 shows one form of card adapted to be utilized in the apparatus.
Fig. 3 is a front elevation of the apparatus.

One suitable form of record card, shown for purposes of illustration, is indicated at 1 in Fig. 2, this card having an opening therein and a protective and removable cover sheet 3 in the opening and with a thin adhesive sheet 2 surrounding the opening and overlapping the card around the opening and extending into the opening. The adhesive sheet 2 is on the back of the card as shown in Fig. 2. This generally rectangular frame or adhesive material may be a thin sheet of cellulose acetate or other transparent material coated on one side with a slow acting inert adhesive such as the adhesive paper marketed under the names of "Duraseal" or "Permaseal" and may have a thickness of around 0.001 inch or 0.0015 inch. In certain of the figures of the drawing this sheet of adhesive is somewhat exaggerated in thickness for purposes of illustration. The sheet is so thin that it does not interfere with the use of the card when secured thereto but it is advantageously located in a compressed or recessed portion 2—*a* of the card as shown in Fig. 14 so that it does not project beyond the surface of the card. This sheet of transparent adhesive material remains transparent and flexible and holds the film firmly in place when the film is inserted in the opening. The protective cover sheet, e. g., of glassine, is not firmly held by the adhesive and is readily removed therefrom, although held sufficiently to permit the card to be punched and classified in standard punching and classifying machines without danger of accidental removal.

In order to use such cards, with an adhesive frame around the opening, the protective glassine cover sheet must be removed and the film inserted therein.

The apparatus for processing such cards and for stripping the cover sheet and inserting the films includes a base plate 4 with an integral wedge-shaped block 5, and the various parts of the apparatus are mounted and supported from this base plate and wedge-shaped block. Upwardly-extending brackets 7 support the screen housing 8 having a translucent screen 9 on which the film to be mounted is projected. Three brackets 6 mounted on the wedge-shaped block 5 are secured to the bottom plate 23 of the plate assembly and support this plate assembly. Brackets 51 and 51' secured to the back of the plate 23 support the stripping elements and an extension 16 of one of these brackets supports the film reel 15 holding the film 14 from which sections are to be cut and inserted in the cards.

A lamp housing 12 is supported on the block 5 and secured to the base plate 4 by a bracket 12—*a*. This lamp housing includes a lamp 13 with a reflector 13' and lens unit 13'' located and arranged to project light through the film and onto the screen 9.

Also mounted on the block 5 are brackets 11 and 11', and mounted therein is a shaft 10 carrying the roll 18 for supporting the film. Also mounted in the brackets is a shaft 22 to which the handle 21 and the arm 21*a* are connected, and between the handle and arm is another shaft 19 carrying the roll 17 and having the operating knob or handle 20 thereon for turning the shaft 19 and the roll 17. This roll 17, as shown in Fig. 3, is cut away at the central portion so that only its outer ends come in contact with the film. A spring 22' serves to press the roll 17 yieldably against the roll 18; while by operating the handle 21 the roll 17 can be moved away from the roll 18 to permit insertion of the film therebetween or to permit movement of the film by hand. By operation of the knob 20 by hand while the roll 17 is pressed against the film, the film can be moved forward as desired.

The plate assembly includes the base plate 23 secured to and supported by the bracket 16 and having raised rims 24 and 24' at its edges secured to the plate by screws. And above these rims 24 and secured thereto are two plates 34 and 37, held by screws 35 and 36. The raised rims 24 and 24' space the plates 34 and 37 away from the base plate 23 and leave a space therebetween. Movably mounted on the base plate 23 is a movable plate 30 and a slide bar 25. The slide bar 25 is located adjacent the rim 24' and has L-shaped end projections 26 and 26' and an operating knob 28. The main portion of this bar 25 slides in a groove 27 in the plate 23 and a groove 27—*a* in the upper plates 34 and 37. The end projection 26' of the bar 25 also is adapted to slide under a portion of the plate 37 in the opening 27—*a* shown in Fig. 6.

The movable plate 30 is located between the bottom plate 23 and the upper plates 34 and 37. The plate 30 has a thicker portion 31 at its upper edge adapted to slide in a groove 29 in the bottom plate 23 and in a corresponding groove 29—*a* in the upper plates 34 and 37. At its ends the plate 30 has L-shaped portions 32 and 32' raised above the main portion of the plate. The L-shaped portion 32' is adapted to slide under a part of the plate 37 in the groove 29—*a*, indicated in dotted lines in Figs. 7 and 8.

The bottom plate 23 is cut away at one end as indicated at 33 in Figs. 7 and 8 to facilitate insertion and removal of the cards. The plate 30 is also cut away for a considerable portion of its width at one end to form the end 43 (Figs. 7 and 8), and is cut away at its other end to form a corner end section 39. Secured to the bottom plate 23 at one end is a pin 38 for limiting the movement of the plate 30; and at the other end of the plate 23 is a similar pin 80 for limiting the movement of the plate 30 in the other direction.

The plate 34 has an opening 42 therein and the plate 23 has a correspondingly located opening 42'' therein. The sliding plate 30 has a corresponding opening 42' which is in registration with the openings 42 and 42'' when the sliding plate 30 is in its extreme position at the left as indicated in Figs. 7 and 11.

The plate 37 has an opening 45 therein and the base plate 23 has a correspondingly located opening 45'' therein. The movable plate 30 also has an opening 45' which registers with the openings 45 and 45'' when the sliding plate 30 is in its extreme left position as shown in Figs. 7 and 11.

In the use of this plate assembly a card such as shown in Fig. 2 is placed on the sliding plate 30 while this plate and the slide bar 25 are at the extreme left, as shown in Figs. 7 and 11, one end of the card being shown in broken lines at 84 and the lower righthand cut-away portion of the card being indicated in broken lines at 85. When the card is in this position it is ready for stripping the protective cover sheet from the opening, the opening in the card being in the same location as the openings 42, 42' and 42'' of the plates 34, 30 and 23. By sliding the bar 25 to the position shown in Figs. 8 and 12 the card is caused to slide over the plate 30 to the position shown in Figs. 8 and 12 so that the opening in the card will be over a solid portion of the plate 30. And by continued movement of the bar 25 to the right it carries the sliding plate 30 and card thereon to the position shown in Figs. 9 and 13 where the opening in the card is brought in registration with the opening 45 in the plate 37 as shown in Fig. 13, and in this position the about shaft 50 to strip said cover sheet gripped between them from the card. As shown in dotted lines in Fig. 7, the members 54, 61 are arranged to grip the cover sheet 3 in the card opening at a location near one corner of said opening.

It will be noted that the toggle 59, 60 is not completely straightened or fully extended when the members 54, 61 are brought together into contact with the cover sheet 3, thus assuring and maintaining a positive gripping action of said members on said cover sheet, and enabling the collective movement of the members 54, 61 through the toggle 59, 60 to strip the cover sheet 3 from the card. Now then, when the handle 62 is lowered from its actuated full line position shown in Fig. 5 after stripping of the cover sheet 3 from the card, and with the toggle 59, 60 in less than straightened condition, said toggle will immediately respond and, hence, break or collapse at the knee joint 58, whereupon the members 54, 61 will first be individually rotated through the breaking action of said toggle in counter-clockwise and clockwise directions, respectively, (Fig. 5) to cause the ends 54', 61' thereof to separate and release the stripped cover sheet 3, and then the members 54, 61 will be collectively rotated in a counter-clockwise direction (Fig. 5) through the broken toggle 59, 60 and returned in separated condition to their force the punch 74 down into the opening 45 in the plate 37 and, when a film is located in proper place for cutting, will cut out the film, and then force it down into the opening in the card and onto the adhesive paper in such opening. The punch 74 serves as the male member and the opening 45 in the plate 37 serves as the female member of a die for cutting out a selected portion of the film. The plate 30 below the opening in the card supports the card when the film section is forced by the male member of the die down onto the adhesive in the card opening. After the film is cut out and mounted in the opening, the springs will force the punch assembly upwardly to the position shown in Fig. 6, after which another section of film can be introduced and centered and subsequently cut out and inserted in a similar manner.

In the operation of the apparatus described, a card such as shown in Fig. 2 is placed on the movable plate 30 while this plate and the slide bar 25 are at the extreme left as shown in Figs. 7 and 11. In this position the opening in the card will register with the openings 42, 42′ and 42″, as indicated in Figs. 7 and 11, where one end of the card is indicated by the broken line 84 and the corner end of the card at the other end is indicated at 85. While the card is in this position the operating handle 62 of the stripping device is raised from the position shown in Fig. 5*a* and in broken lines in Fig. 5 to the position shown in full lines in Fig. 5. This causes the jaws of the members 54 and 61 to come together and seize the cover sheet at the point indicated in broken lines in Fig. 7 after which the cover sheet is pulled off of the adhesive by continued movement of the mechanism so that the cover sheet will have the position indicated at 3 in Fig. 5. On lowering the handle 62 the cover sheet is released and the stripping members returned to the position shown in Fig. 5*a* and in broken lines in Fig. 5.

After the protective sheet has been thus removed the operator slides the bar 25, by means of the knob 28, to the right and moves the card on the sliding plate 30 without moving the sliding plate, until the card has the position indicated in Figs. 8 and 12, after which further movement of the bar 25 moves the plate 30 and the card thereon to the final position shown in Figs. 9 and 13 with the opening in the card in alignment with the opening 45 in the upper plate 37 and supported by a solid portion of the plate 30.

Prior to the movement of the card and slide 30 from its stripping position shown in Figs. 7 and 11, the film 14 is threaded through the groove 63 and between the rollers 17 and 18. Light is projected through the openings 45″, 45′ and 45 and through the film and the hollow die and supporting members onto the translucent screen 9. Movement of the wheel 17 by the hand operated knob 20 permits the film to be brought into exact registration so that the portion of the film to be cut out will appear on the screen. The operator can thus observe the film and check it against the card in which it is to be inserted to see that the identifying data on the card corresponds to the film to be inserted therein. This can be done before the card is inserted in the plate assembly for removing the protective covering sheet from the opening. When the card is then inserted and the cover strip removed and the card then moved to the position shown in Figs. 9 and 13, it is ready for the insertion of the selected film therein. In this position the operation of the punch mechanism by the handle 78 will cause the punch to pass downwardly and cut out the selected portion of the film and with continued downward movement of the punch member the cut-out portion of the film will be forced down into the opening and onto the adhesive, pressure being applied between the punch member 74 and the plate 30 which supports the card when in the position shown in Fig. 13.

In practice, the operations are simple and readily and quickly accomplished and successive sections of film can be rapidly mounted on successive cards. With the cards previously prepared and punched and printed with identifying data so that they are ready for the insertion of the film, and arranged in the same order as the film sections to be mounted, the operator can move the film to the place where projection indicates the section to be cut out for mounting on the card. The operator can observe the film and check it against the identifying data on the card, then insert the card in the plate assembly located as shown in Figs. 7 and 11, operate the stripping device by raising the arms 62 to remove the cover sheet from the opening, then push the knob 28 to the right to move the card over the plate 30 to the position shown in Figs. 8 and 12 and then with continued movement to move the plate 30 and card to the final position shown in Figs. 9 and 13, whereupon operation of the punch press lever will cut out the selected portion of the film and mount it in the opening and force it against the adhesive to complete the preparation of the card. By then moving the knob 28 and slide bar 25 to the left the card will first be moved over the plate 30 until the L-shaped end 26′ reaches the end of the cut-away portion of the plate 30 indicated at 39 in Fig. 9 after which further movement of the slide bar 25 to the left will cause the plate 30 and card thereon to be moved to the position shown in Figs. 7 and 11, whereupon the card can readily be removed. The cut-away portion 33 in the bottom plate 23 facilitates the grasping of one end of the card to remove it and to insure that the card is in proper position when first inserted.

The sliding plate 30 in its extreme left position shown in Figs. 7 and 8 abuts against the pin 38 and in its extreme right position shown in Fig. 9 abuts against the pin 80. The slide bar 25 in its extreme right position shown in Fig. 9 forces the slide 30 to its righthand position. When the slide member 25 is moved to its extreme left position as shown in Fig. 7 it forces the plate 30 to its extreme left position. Preliminary movement of the slide bar 25, however, before the projection 26 engages the end portion 43 at the left, and before the L-shaped portion 26′ reaches the cut-away end portion 39 at the right, will move the card over the plate 30 after which continued movement of the bar 25 will move the plate 30 and the card thereon. This permits the card when first inserted to be in a position where the cover sheet can readily be stripped by the stripping mechanisms operating through the registered openings 42, 42′ and 42″, then permits the card to slide over the plate 30 until the opening is supported by a solid portion of the plate 30 in which position the opening is caused to register with the opening 25 so that the film can be inserted in this position.

It is a particular advantage of the apparatus of the present invention that it enables a temporary protective cover sheet to be easily and rapidly stripped or removed from the openings of previously-prepared cards of the type referred to and a film then mounted in the opening to give a finished card, such as is illustrated in Fig. 14, with the film section 14 forced down onto the adhesively-coated sheet 2.

While the invention has been described in connection with the removal of temporary cover sheets secured to adhesively-coated sheets 2, which, in turn, are secured to the marginal edges of the cards defining the openings in them, it will be understood that it is equally applicable for the removing of protective cover sheets which may temporarily be secured directly to the marginal edges of the card surrounding an opening therein.

The improved stripping apparatus of the present invention is particularly advantageous for use in apparatus for mounting microfilm sections in classification cards which are to be used in film libraries. The stripping mechanism can also be advantageously used in apparatus for mounting other translucent or transparent inserts in openings in the cards, such as inserts containing addresses typed or printed on translucent papers or on films.

It will thus be seen that the present invention provides an improved stripping apparatus which can be simply and readily operated by hand for stripping a protective cover sheet from the adhesive in an opening in a card so that a transparent or translucent insert may be mounted therein.

I claim:

1. Apparatus for removing a temporary cover sheet from a marginal edge defining an opening in a card which comprises movable members having gripping portions normally spaced apart, means for holding a card against facewise displacement and with the opening therein between the gripping portions of said members, means for moving one of said members in one direction and the other of said members in the opposite direction to cause the gripping portions thereof to move towards one another and to grip the cover sheet between them, and means for thereafter moving said members as a unit with the gripping portions gripping the cover sheet between them in one of said directions to remove the cover sheet from the card.

2. Apparatus for removing a temporary cover sheet from a marginal edge defining an opening in a card which comprises movable members having gripping portions normally spaced apart, means for holding a card against facewise displacement and with the opening therein between the gripping portions of said members, and means for moving said members, first to cause the gripping portions thereof to move towards one another and to grip the opposite sides of the cover strip between them and thereafter in a direction substantially perpendicular to a face of said card to remove the cover sheet from the card.

3. Apparatus for removing a temporary cover sheet from a marginal edge defining an opening in a card which comprises movable members having gripping portions normally spaced apart, means for holding a card against facewise displacement and with the opening therein between the gripping portions of said members, means for relatively moving said members to cause the gripping portions thereof to approach one another and to grip the cover sheet between them, and means for thereafter moving said members in unison with the gripping portions gripping the cover sheet between them in a direction substantially perpendicular to a face of said card to remove the cover sheet from the card.

4. A stripping machine adapted for the stripping of a temporary cover sheet from a margin of adhesive paper in the aperture of a card including supports for the card having openings between which the aperture in the card can be located, movable fingers normally spaced apart one on each side of the cover sheet in the aperture in the card when so placed, means for moving and pressing said fingers together to grip the cover sheet, and means for moving one of said fingers in gripping position through the aperture in the card and beyond the latter and the supports to remove the cover sheet from the card.

5. A machine for removing a temporary cover sheet from a marginal edge defining an opening in a card which comprises movable members pivotally mounted on the same shaft and having gripping portions which in one position are spaced apart a distance sufficient to permit insertion of a card between them with the opening therein between the gripping portions, means for relatively moving said members about said shaft from said position to cause the gripping portions thereof to approach one another and to grip the cover sheet between them, and means for moving said members as a unit about said shaft with the gripping portions gripping the cover sheet between them in a direction to remove the cover sheet from the card.

6. A machine for removing a temporary cover sheet from a marginal edge defining an opening in a card which comprises movable members pivotally mounted on the same shaft and having gripping portions which in one position are spaced apart a distance sufficient to permit insertion of a card between them with the opening therein between the gripping portions, means including a toggle connection between the members for moving said members about said shaft, first relatively to cause the gripping portions thereof to move towards one another and to grip the opposite sides of the cover sheet between them and thereafter collectively in a direction to remove the cover sheet from the card.

7. A stripping machine adapted for the stripping of a temporary cover sheet from a margin of adhesive paper in the aperture of a card, including supports for the card having openings between which the aperture in the card can be located, movable fingers pivotally mounted on the same shaft and with their ends normally spaced apart one on each side of the cover sheet in the aperture in the card when so placed, operating devices moving said fingers about the shaft and pressing their ends together to grip the cover sheet, and for then moving the fingers in gripping position around the shaft to separate the cover sheet from the card.

8. A stripping machine adapted for the stripping of a temporary cover sheet from a margin of adhesive paper in the aperture of a card, including a plate assembly with stationary plates spaced apart and having aligned openings therein, a slidable card-supporting plate disposed between said stationary plates and also having an opening therein aligned with the aperture in the card supported thereon for bringing the card with its aperture in alignment with the openings in the stationary plates, pivotally mounted fingers, mounted on the same pivot, and having their ends spaced apart and located one in each of the openings in said stationary plates, an operating arm and connecting levers for moving said pivotally mounted fingers individually about the pivot to bring their ends together and press them against the temporary cover sheet, and for further moving said fingers collectively with the sheet gripped therebetween around the pivot to separate the sheet from the card.

9. In a card preparing machine, mechanism for stripping a temporary cover sheet from the adhesive surface of a margin of adhesive material exposed through the aperture of a card to one surface of which a frame of adhesive material has been applied around and extending over the aperture, comprising the combination of a card-support plate having an opening adapted to be aligned with the aperture in the card, a pair of engageable finger members each normally separated from the other and disposed on an opposite side of said opening in said card support plate, means for engaging said finger members within said opening to grasp said cover sheet therebetween, means for moving one of said finger members through the aperture of said card and through said opening while said finger members grasp the cover sheet to strip said cover sheet from said adhesive material, and means for limiting the movement of the card away from said support plate as said cover sheet is stripped from said adhesive materal.

NATHAN HARRISON MORRISON.

REFERENCES CITED

The following references are of record in the file of this patent:

UNITED STATES PATENTS

| Number | Name | Date |
|---|---|---|
| 1,133,805 | Klein | Mar. 30, 1915 |
| 1,822,501 | Onsrud | Sept. 8, 1931 |
| 2,414,937 | Elliott | Jan. 28, 1947 |

OTHER REFERENCES

"American Machinist," March 14, 1946, page 141.